US011964804B2

(12) United States Patent
Bull

(10) Patent No.: US 11,964,804 B2
(45) Date of Patent: Apr. 23, 2024

(54) CONTAINER WITH SEAL TO COVER A VENT

(71) Applicant: Henkel AG & Co. KGaA, Duesseldorf (DE)

(72) Inventor: Nicholas Robert Bull, Ridgefield, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/702,371

(22) Filed: Mar. 23, 2022

(65) Prior Publication Data

US 2022/0306361 A1 Sep. 29, 2022

Related U.S. Application Data

(60) Provisional application No. 63/166,662, filed on Mar. 26, 2021.

(51) Int. Cl.

*B65D 51/16* (2006.01)
*B65B 3/02* (2006.01)
*B65B 3/04* (2006.01)
*B67D 3/00* (2006.01)

(52) U.S. Cl.

CPC .......... *B65D 51/1683* (2013.01); *B65B 3/022* (2013.01); *B65B 3/04* (2013.01); *B67D 3/0061* (2013.01)

(58) Field of Classification Search

CPC ....... B65D 51/1683; B65B 3/022; B65B 3/04; B67D 3/0061
USPC .......................................... 222/481; 220/363
See application file for complete search history.

(56) References Cited

U.S. PATENT DOCUMENTS

| | | | | | | |
|---|---|---|---|---|---|---|
| 660,051 | A | * | 10/1900 | Croft | B65D 7/36 | 220/363 |
| 2,808,965 | A | * | 10/1957 | Graphia, III | B67D 3/00 | 222/183 |
| 2,898,015 | A | * | 8/1959 | Borah | B65D 47/32 | 222/484 |
| 3,433,456 | A | * | 3/1969 | Mueller | B67D 3/043 | 251/339 |
| 3,595,445 | A | * | 7/1971 | Buford | B67D 3/042 | 222/511 |
| 3,685,679 | A | * | 8/1972 | Heffran | B65D 41/42 | 220/270 |
| 3,990,615 | A | * | 11/1976 | Kerwin | B65D 17/502 | 222/541.9 |
| 4,029,033 | A | * | 6/1977 | Kerwin | B65D 17/502 | 222/541.9 |

(Continued)

FOREIGN PATENT DOCUMENTS

WO WO-2016069755 A1 * 5/2016 ............. B65D 43/02

*Primary Examiner* — Paul R Durand
*Assistant Examiner* — Michael J. Melaragno
(74) *Attorney, Agent, or Firm* — Sterne, Kessler, Goldstein & Fox P.L.L.C.

(57) ABSTRACT

A container for dispensing a liquid can include a body and a seal. The body can include a plurality of walls that define an interior storage volume, an outlet through a first wall of the body for dispensing the liquid, and a vent opening. The seal can cover the vent opening. The seal can include an adhesive to removably couple the seal to the body of the container. The vent opening can include a plurality of openings, and the seal can cover all of the openings.

20 Claims, 7 Drawing Sheets

(56) References Cited

U.S. PATENT DOCUMENTS

| | | | | |
|---|---|---|---|---|
| 4,135,637 | A * | 1/1979 | Hannula | B65D 17/28 222/485 |
| 4,452,425 | A * | 6/1984 | Lucking | B67D 3/043 222/518 |
| 4,579,260 | A * | 4/1986 | Young | B65D 1/18 215/383 |
| 4,656,077 | A * | 4/1987 | Larimore | C09J 7/385 428/156 |
| 4,781,314 | A * | 11/1988 | Schoonover | B65D 1/18 215/396 |
| 4,923,098 | A * | 5/1990 | Schoonover | B65D 25/2885 220/675 |
| 4,949,882 | A * | 8/1990 | Take | B65D 5/708 222/541.9 |
| 4,964,532 | A * | 10/1990 | Kirschner | B67D 1/0078 222/481.5 |
| 5,209,377 | A * | 5/1993 | Steiner | A47K 5/1209 222/189.09 |
| 5,295,610 | A * | 3/1994 | Levison | F01M 3/00 D9/527 |
| 5,433,346 | A * | 7/1995 | Howe | B65D 77/06 222/481.5 |
| 5,439,144 | A * | 8/1995 | Holzner | A47K 5/1209 222/207 |
| 5,464,133 | A * | 11/1995 | Drummond | B65D 51/20 222/510 |
| 5,472,121 | A * | 12/1995 | Silano | B65D 47/127 222/481.5 |
| 5,489,046 | A * | 2/1996 | Wickham | B65D 83/00 222/534 |
| 5,673,817 | A * | 10/1997 | Mullen | B65D 77/06 222/105 |
| 5,971,218 | A * | 10/1999 | Le | B67D 3/04 220/849 |
| 6,073,812 | A * | 6/2000 | Wade | B65D 51/1616 222/189.09 |
| 6,238,552 | B1 * | 5/2001 | Shannon | C02F 1/003 210/473 |
| 6,296,157 | B1 * | 10/2001 | Erb | B67D 3/043 222/509 |
| 6,386,393 | B1 * | 5/2002 | Paulovich | B67D 3/0083 211/80 |
| 6,631,744 | B1 * | 10/2003 | Gerhart | B65D 23/00 141/381 |
| 7,900,796 | B2 * | 3/2011 | Ungrady | B65D 25/00 220/675 |
| 8,602,387 | B2 * | 12/2013 | Wrigley | B65D 47/283 222/541.9 |
| 8,833,617 | B1 * | 9/2014 | Compton | B65D 47/065 222/536 |
| 8,893,924 | B2 * | 11/2014 | Cash | B65D 1/20 206/509 |
| 9,448,095 | B2 * | 9/2016 | Maher | B65D 11/22 |
| 9,944,435 | B2 * | 4/2018 | Mithal | A47G 19/2272 |
| 11,001,420 | B2 * | 5/2021 | Gabriel | B65D 25/2894 |
| 2001/0012530 | A1 * | 8/2001 | Hiyoshi | B65D 77/225 220/203.11 |
| 2003/0213813 | A1 * | 11/2003 | Cook | B65D 77/067 222/105 |
| 2004/0069799 | A1 * | 4/2004 | Gee | B65D 51/227 222/83 |
| 2004/0178222 | A1 * | 9/2004 | Clausen | F25D 23/126 220/592.16 |
| 2005/0000984 | A1 * | 1/2005 | Tan | B67D 1/0009 222/189.09 |
| 2006/0030472 | A1 * | 2/2006 | Hartman | B65D 81/2038 493/213 |
| 2006/0054584 | A1 * | 3/2006 | Jackman | B65D 51/20 215/347 |
| 2006/0138180 | A1 * | 6/2006 | Giblin | B65D 41/26 222/570 |
| 2007/0160408 | A1 * | 7/2007 | Peterson | B65D 75/30 400/621 |
| 2007/0246488 | A1 * | 10/2007 | Cash | B65D 1/20 222/143 |
| 2007/0290001 | A1 * | 12/2007 | Bachrach | B67D 3/0019 222/183 |
| 2008/0314933 | A1 * | 12/2008 | Leonoff | B65D 23/00 222/215 |
| 2011/0084090 | A1 * | 4/2011 | MacDougall | B65D 47/061 222/481.5 |
| 2014/0353183 | A1 * | 12/2014 | Cooper | B67D 3/043 206/459.1 |
| 2021/0387788 | A1 * | 12/2021 | Gorman | B65D 81/3469 |
| 2022/0306361 | A1 * | 9/2022 | Bull | B65D 25/40 |
| 2023/0105310 | A1 * | 4/2023 | Kelley | B65D 47/32 222/481.5 |

* cited by examiner

CONTAINER WITH SEAL TO COVER A VENT

CROSS-REFERENCE TO RELATED APPLICATION

This application claims the benefit of U.S. Provisional application No. 63/166,662, filed Mar. 26, 2021, which is incorporated herein in its entirety by reference thereto.

BACKGROUND

The present disclosure relates to devices and methods for venting a container, more specifically to a seal that, when removed, vents the interior volume of the container body.

BRIEF SUMMARY

Some embodiments are directed to a container for dispensing a liquid that includes a body and a seal. In some embodiments, the body includes a plurality of walls defining an interior storage volume, an outlet through a first wall of the body for dispensing the liquid, and a vent opening. In some embodiments, the seal covers the vent opening, and the seal includes an adhesive to removably couple the seal to the body of the container.

In some embodiments, the seal includes an upper surface and a lower surface configured to contact the body. In some embodiments, the adhesive is disposed on the lower surface of the seal.

In some embodiments, the seal has a thickness of about 0.05 mm to about 0.75 mm.

In some embodiments, the seal is configured to detach from the body, and the seal is configured to re-seal the vent opening when the adhesive contacts the body.

In some embodiments, the outlet is disposed proximate to a bottom of the body, and the vent opening is disposed in a second wall that defines a top of the container.

In some embodiments, the container includes a dispenser coupled to the outlet, and the dispenser includes a valve configured to dispense the liquid.

In some embodiments, the container is a gravity-fed container.

In some embodiments, the seal has a length of about 5 mm to about 50 mm and a width of about 5 mm to about 20 mm.

In some embodiments, an area of an upper surface of the seal is at least 25% larger than an area of the vent opening such that the seal covers the vent opening and adheres to a second wall of the body.

In some embodiments, an area of the vent opening is about 3 $mm^2$ to about 100 $mm^2$.

In some embodiments, an area of the seal is about 4.5 $mm^2$ to about 1000 $mm^2$.

In some embodiments, the adhesive is a pressure sensitive adhesive.

In some embodiments, the interior storage volume has a volume of about 0.2 L to about 4 L.

In some embodiments, the vent opening includes a plurality of openings.

In some embodiments, the container is a blow-molded container.

Some embodiments are directed to method of making a container with a vent. In some embodiments, the method includes forming the container. In some embodiments, the container includes a body defining an interior storage volume and an outlet through a first wall of the body for dispensing a liquid. In some embodiments, the method includes creating a hole in the body to form the vent. In some embodiments, the method includes coupling a seal to the body to cover the vent. In some embodiments, the seal includes an adhesive on a lower surface of the seal.

In some embodiments, forming the container includes blow-molding a preform.

In some embodiments, creating the hole includes melting, drilling, cutting, or piercing the body to form the vent.

In some embodiments, coupling the seal to the body includes positioning the lower surface of the seal proximate to the vent and applying pressure to an upper surface of the seal toward the body.

In some embodiments, the method further includes filling the container with a liquid.

BRIEF DESCRIPTION OF THE FIGURES

The accompanying drawings, which are incorporated herein and form a part of the specification, illustrate the embodiments and, together with the description, further serve to explain the principles of the embodiments and to enable a person skilled in the relevant art(s) to make and use the embodiments.

DETAILED DESCRIPTION

Figure 1:
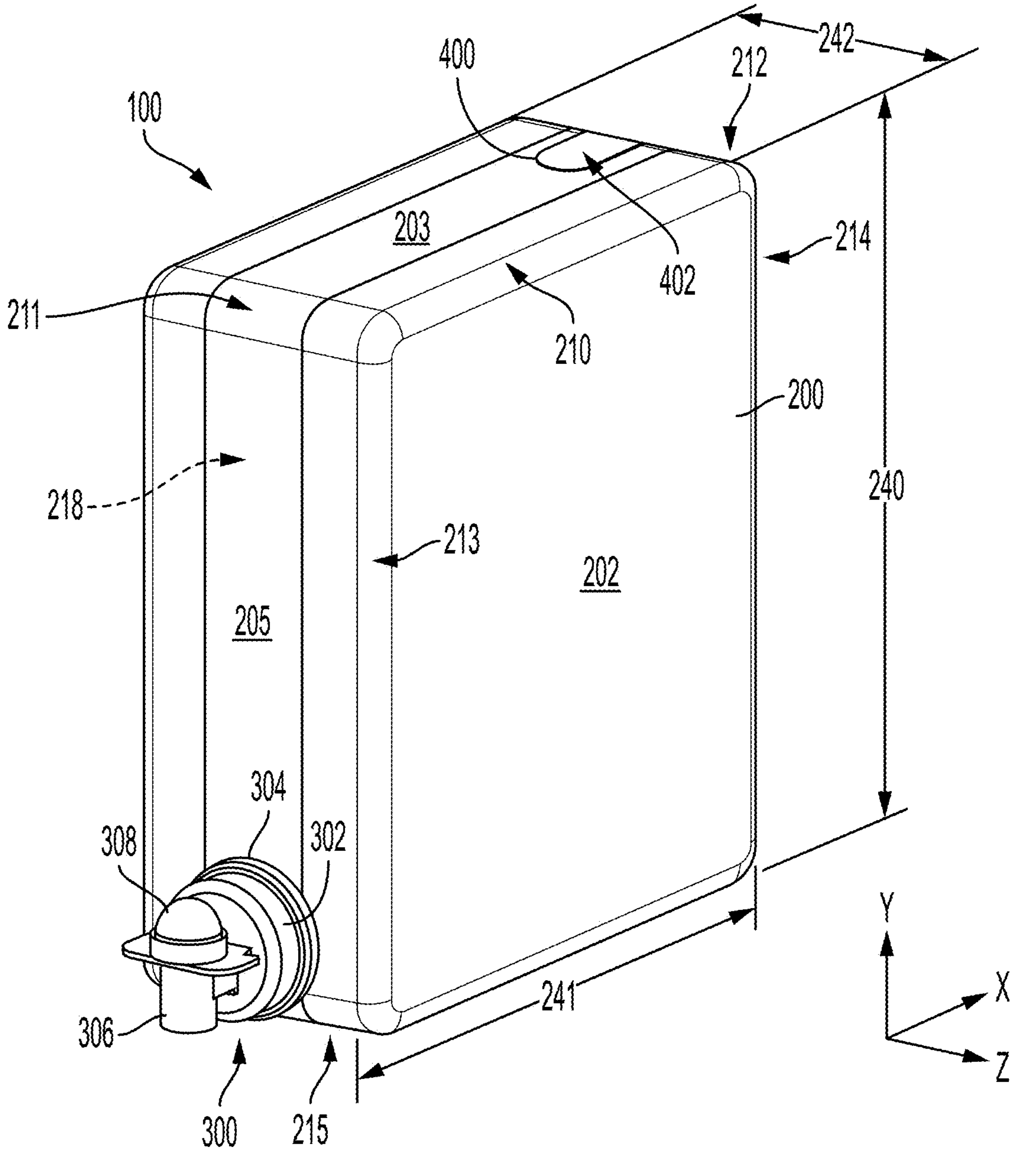
FIG. 1 is a perspective view of a container according to some embodiments with the seal in the closed position.

Larger dispensing containers, for example containers for storing liquid, are often provided with a dispensing closure (e.g., a tap-style closure) for convenient dispensing of the contents without the need to lift and pour from the bottle. So that all of the contents may be dispensed, the tap is typically located on a dispensing neck at or near the bottom of the container (when in the in-use/dispensing orientation). These containers often have a path for air to re-enter the container and replace the volume of the displaced liquid. Otherwise, the container may deform due to internal vacuum or negative air pressure in the container. And the flow of liquid may slow or cease as the amount of vacuum equalizes with the head pressure of the liquid.

To compensate for the pressure change as the liquid exits the container, some containers use a second opening at or near the top of the container to vent the container. Some containers use a second neck and second closure located opposite the dispensing neck and closure on the upper portion of the bottle when oriented for dispensing. The second closure is typically removed or loosened when dispensing to allow the container to vent. But this design may be more difficult to manufacture and use more plastic than a similar container with only one neck. And the addition of a second opening increases the chance of leaking during manufacturing, distribution before use, and also while using the product. Further, the second neck is typically large enough to allow refilling of the container, which increases the risk of the container being reused with an incompatible and/or counterfeit liquid. And it is not desirable or attractive to have the venting location, particularly in the form of a second neck and closure, facing the user when in the dispensing orientation. A second neck also requires a large amount of headspace in the container so that the container does not leak when it is vented when full.

Other containers require a user to pierce the container, for example using a sharp tool such as a knife. Often this piercing is done in a prescribed location molded or embossed into the container. This can create inconsistent venting from container to container and require using extra tools or sharp objects. Also, asking the user to find an appropriate tool (knife, scissors, etc.) to puncture a hole in the upper part of the bottle is crude and inconvenient. There is also a risk that the container will leak if the user pierces the container in the wrong location (e.g., below the headspace of the container).

Therefore, there is a need for a container that includes a vent in a location (e.g., on the opposite corner (upper rear) from the dispensing closure and neck (lower front)) that is desirable for aesthetics and consumer convenience. And there is a need for a container that can be vented in a self-contained way. For example, there is a need for a container that can be vented to create an air pathway using only the components that are distributed with the container, requiring no additional tools.

Embodiments described herein overcome these and other challenges by providing—among other benefits—a single-neck container that can be vented without any additional tools. The present disclosure describes methods and apparatuses for venting a container (e.g., by piercing the container). As shown throughout the figures, container 100 can include body 200, closure 300, and seal 400. As described in more detail below, seal 400 can cover one or more vent openings 500. Seal 400 can include a substrate (e.g., substrate 406) that covers vent openings 500 and an adhesive (e.g., adhesive 408) that secures seal 400 to body 200. In some embodiments, body 200 can be vented, for example, by simply removing seal 400 from body 200.

Figure 2:
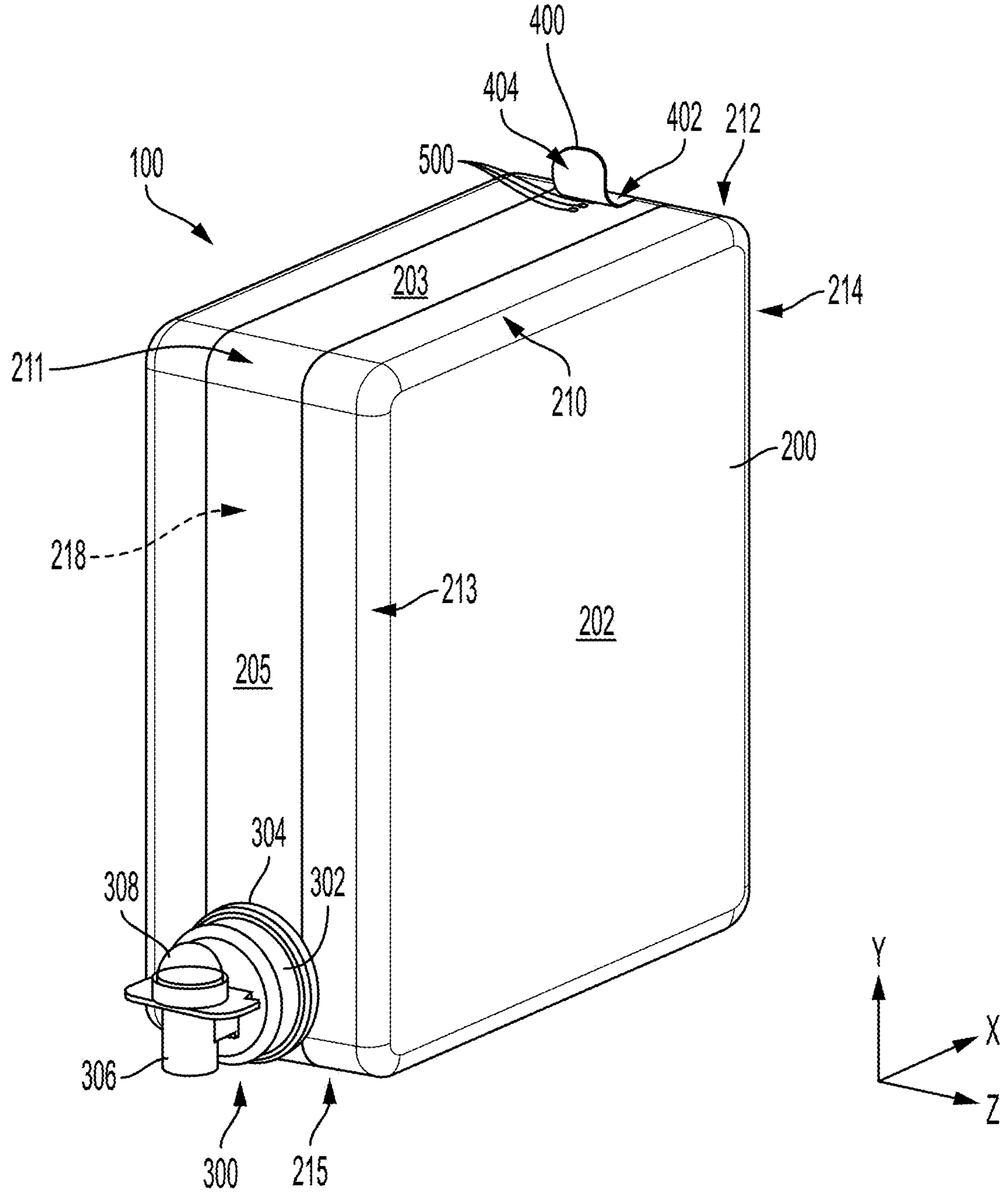
FIG. 2 is a perspective view of the container of FIG. 1 with the seal at least partially removed.

As shown in FIG. 1, for example, in some embodiments, container 100 can include closure 300 that seals body 200. In some embodiments, closure 300 can be coupled to a neck of body 200, as shown in FIGS. 1 and 2. In some embodiments, closure 300 can be a closure that seals body 200 and is removed before use. Closure 300 can be a seal that is broken prior to use. In some embodiments, closure 300 can be a dispenser (e.g., a tap-style dispenser), as shown for example in FIGS. 1 and 2.

In some embodiments, seal 400 can be removably coupled to body 200. For example, seal 400 can be coupled to body 200 as shown in FIG. 1 and removed as shown in FIG. 2. When seal 400 is removed, or at least partially removed, from body 200, one or more vent openings 500 can be exposed. Once exposed, vent openings 500 can allow body 200 to vent as liquid is dispensed from body 200 (e.g., from a tap-style dispenser) to accommodate the change in pressure due to displaced liquid.

In some embodiments, container 100 can include body 200 for holding a liquid. The liquid can be any liquid suitable for dispensing from a container. For example, in some embodiments, the liquid can include detergents, soaps, or cleaning products that are stored in container 100 or used to refill container 100. In some embodiments, the liquid includes one or more of laundry detergent, fabric softener, hand soap, shampoo, conditioner, body wash, face soap, lotion, dish soap, hair products (e.g., gel), counter cleaners, toilet cleaners, or bath cleaners. In some embodiments, the liquid is a detergent (e.g., laundry detergent). In some embodiments, the liquid is a fabric softener. Other suitable liquids can be stored in and dispensed from body 200.

In some embodiments, container 100 is a gravity-fed container, meaning liquid inside the container flows out of the container by the force of gravity. In some embodiments, container 100 can be stored, for example, on a counter, shelf, or other flat surface and liquid in the container can be dispensed directly from the container (e.g., into a dose cup, a cap, or a person's hand). In some embodiments, container 100 can be mounted on a substantially vertical surface (e.g., walls or sides of cabinets, sides of appliances, etc.).

As shown in FIGS. 1-2 and 5A-5D, for example, body 200 can include side walls 202; top wall 203; back wall 204; front wall 205; edges 210, 211, 212, 213, 214, and 215; and interior volume 218.

As shown in FIG. 1, for example, body 200 can have a height 240 in the Y-direction, a length 241 in the X-direction, and a width 242 in the Z-direction. In some embodiments, height 240 can be between about 100 mm to about 400 mm (e.g., about 150 mm to about 300 mm or about 200 mm to about 250 mm). In some embodiments, height 240 is about 225 mm. In some embodiments, length 241 can be between about 100 mm to about 400 mm (e.g., about 125 mm to about 300 mm or about 150 mm to about 250 mm). In some embodiments, length 241 is about 200 mm. In some embodiments, width 242 is about 50 mm to about 200 mm (e.g., about 60 mm to about 150 mm or about 80 mm to about 100 mm). In some embodiments, width 242 is about 90 mm. Body 200 is shown as a substantially cuboid shape for convenience throughout the figures. However, it is to be understood that body 200 can take various shapes, including non-regular shapes or organic shapes with curved sides. Further, it is to be understood that the dimensions described above may not be the dimensions across all of body 200. For example, body 200 can have a height equal to height 240 at one point along a cross-section of body 200, and a height different than height 240 at another point along a cross-section of body 200.

In some embodiments, body 200 of container 100 can include interior volume 218 defined in part by outer walls of body 200 (e.g., Fbottom wall 201, side walls 202, top wall 203, back wall 204, or front wall 205). In some embodiments, interior volume 218 can have a volume of about 0.2 L to about 8 L (e.g., about 0.2 L to about 2 L, about 1 L to about 6 L, or about 3 L to about 5 L). In some embodiments, interior volume 218 has a volume of about 0.2 L to about 2 L. In some embodiments, interior volume 218 has a volume of about 2 L to about 4 L. In some embodiments, interior volume 218 has a volume of at least 2 L. In some embodiments, interior volume 218 has a volume of about 4 L. The container can be filled with a liquid. In some embodiments, the liquid is disposed in interior volume 218. The capacity of liquid in the container can be less than the total volume of interior volume 218. The remaining volume (i.e., the headspace) can be air at atmospheric pressure.

In some embodiments, container 100 can include closure 300 that seals an outlet of the container. Closure 300 can couple to body 200 at a neck. Various closures can be used to seal the outlet. An example closure is shown in FIGS. 1 and 2. For example, in some embodiments, closure 300 can include a seal that covers and seals the outlet prior to use. The seal can be broken or removed prior to use to expose a flow path through the outlet. In some embodiments, closure 300 can include a frangible seal that seals the outlet and is configured to be broken prior to use. In some embodiments, closure 300 can be a dispenser configured to seal the outlet and dispense liquid disposed in interior volume 218. For example, closure 300 can be a dispenser (e.g., a tap-style dispenser) having a valve configured to open to dispense liquid and close to seal the outlet.

In some embodiments, closure 300 can include side wall 302, for example, surrounding the neck and/or a flange 304. Closure 300 can couple to body 200 at the neck. For example, closure 300 can include side wall 302 that couples to the neck and flange 304 that contacts front wall 205 of body 200. In some embodiments, side wall 302 of closure 300 includes internal threads that couple with external threads of the neck. In some embodiments, closure 300 is coupled to body 200 by interference fit. In some embodiments, closure 300 is removably coupled to the neck.

In some embodiments, container 100 can include seal 400 that covers and seals vent opening(s) 500. In some embodiments, seal 400 can be removably coupled to body 200. For example, in some embodiments, seal 400 can be coupled to body 200 such that seal 400 covers vent openings 500, as illustrated in FIG. 1. Seal 400 is shown as a substantially rectangular shape. However, seal 400 can have various shapes. For example, in some embodiments, seal 400 is a circle, oval, square, parallelogram, rectangle, freeform shape, or combination thereof.

In some embodiments, seal 400 can be removed, or partially removed, from body 200 to expose vent openings 500, as illustrated in FIG. 2. In some embodiments, seal 400 is configured to detach from body 200 in response to a force applied to seal 400, for example, in a direction normal to and away from body 200. In some embodiments, seal 400 is configured to detach from body 200 to expose vent openings 500 and then re-attach to body 200 to re-seal vent openings 500 when adhesive 408 contacts body 200. When seal 400 is removed to expose vent openings 500, body 200 is able to vent the interior volume 218 (e.g., through vent openings 500) to accommodate pressure changes within body 200 as liquid is dispensed.

Figure 4A:
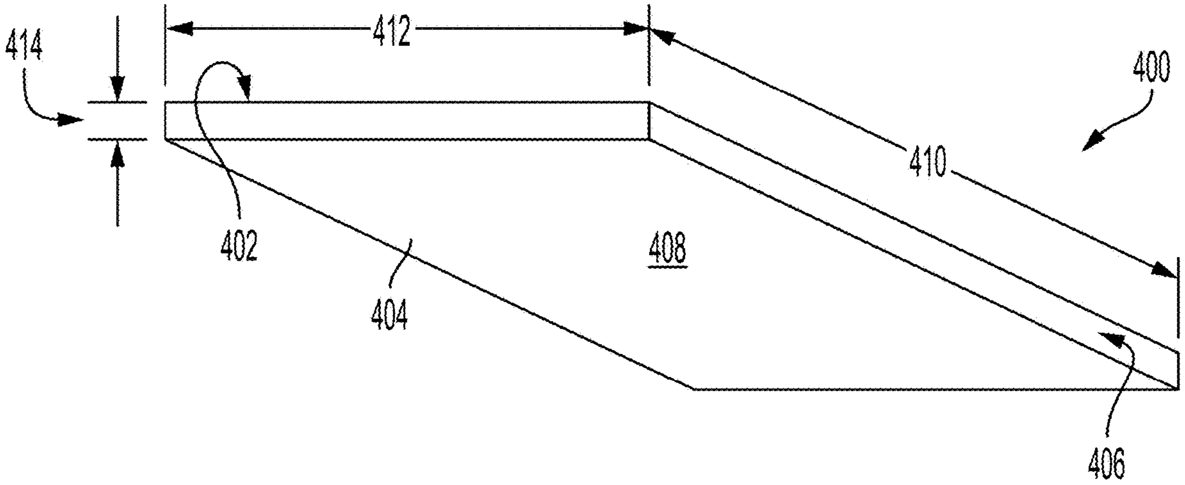
FIGS. 4A-4D illustrate seals according to some embodiments.
Figure 4B:
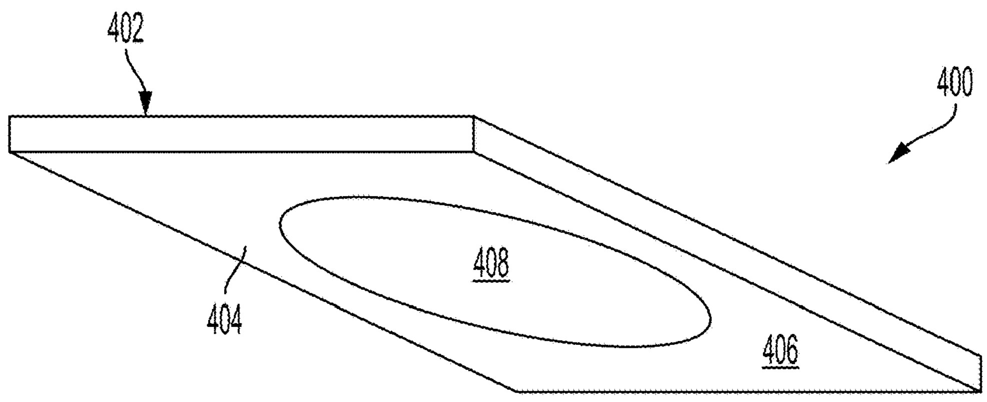
Figure 4C:
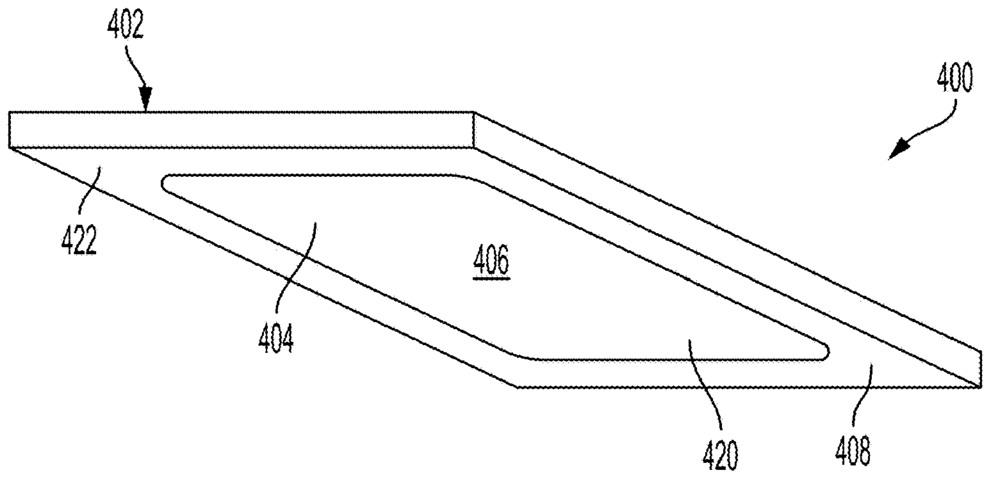
Figure 4D:
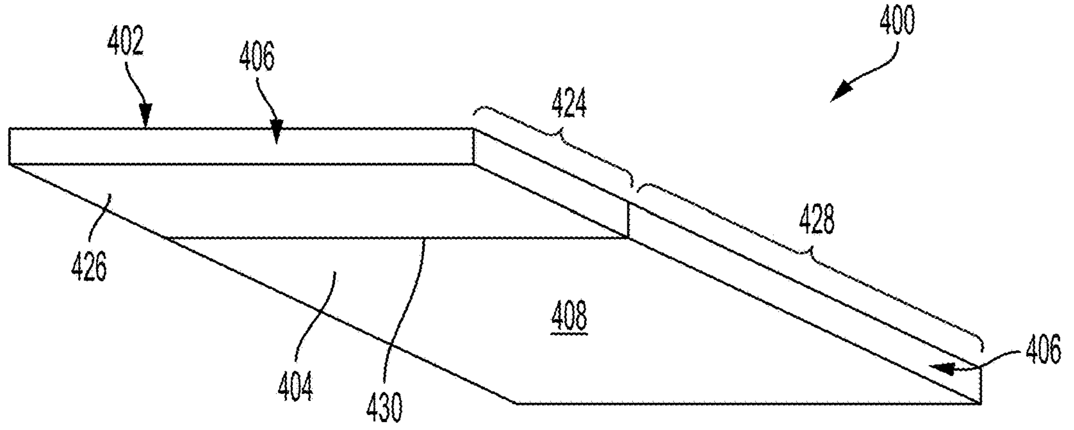

Seal 400 can have upper surface 402 and lower surface 404, as illustrated for example in FIGS. 1, 2, and 4A-4D. In some embodiments, the lower surface contacts body 200 and covers vent openings 500. As illustrated in FIGS. 4A-4D, for example, seal 400 can include substrate 406 and adhesive 408. In some embodiments, substrate 406 includes a cellulose-based substrate (e.g., paper or paper board). In some embodiments, substrate 406 includes a polymer-based substrate (e.g., polyethylene terephthalate, polyolefin, polypropylene, or combination thereof). Seal 400 can include adhesive 408 on one side of seal 400, for example, lower surface 404. In some embodiments, as illustrated in FIG. 4A, adhesive 408 can cover an entire side of seal 400, for example, lower surface 404. In some embodiments, as illustrated in FIGS. 4B-4D, adhesive 408 can cover less than the entire side of seal 400. In some embodiments, as illustrated in FIG. 4B, adhesive 408 can be disposed proximate to or around a center 420 of one side of seal 400. In some embodiments, as illustrated in FIG. 4C, adhesive 408 can be disposed around perimeter 422 of seal 400 such that the outer edges of seal 400 are coupled to body 200. In some embodiments, adhesive 408 covers between about 10% and about 90% (e.g., about 20% to about 80% or about 40% to about 60%) of one side of seal 400. In some embodiments, adhesive 408 covers about 50% of one side of seal 400. In some embodiments, adhesive 408 covers more than 25% of one side of seal 400. In some embodiments, adhesive 408 covers more than 50% of one side of seal 400. In some embodiments, adhesive 408 covers more than 75% of one side of seal 400.

In some embodiments, as illustrated in FIG. 4D, seal 400 can include tab 426. In some embodiments, tab 426 does not include adhesive such that tab 426 is not adhered to body 200, which can facilitate removal of seal 400. In some embodiments, seal 400 includes adhesive 408 only on second portion 428 on one side of seal 400 (e.g., lower surface 404) such that only second portion 428 adheres to body 200. In some embodiments, the remainder of seal 400 (e.g., first portion 424) forms tab 426 that is not adhered to body 200. In some embodiments, seal 400 can be removed by pulling tab 426.

In some embodiments, seal 400 is configured to be partially removed to expose vent openings 500. For example, in some embodiments, first portion 424 includes adhesive 408 on lower surface 404, and only first portion 424 can be detached from body 200 while second portion 428 remains attached to body 200. In some embodiments, seam 430 (e.g., a perforation line) allows first portion 424 to be separated (e.g., torn) from second portion 428 when first portion 424 is detached (e.g., peeled off) from body 200. In some embodiments, seal 400 can be folded at seam 430. In some embodiments, seal 400 includes adhesive 408 at first portion 424 on upper surface 402 such that first portion 424 may be detached from body 200, folded over, and adhered to second portion 428. In some embodiments, seal 400 has sufficient rigidity such that when first portion 424 is detached from body 200 seal 400 can be folded at seam 430 so that first portion 424 remains upright.

Figure 3:
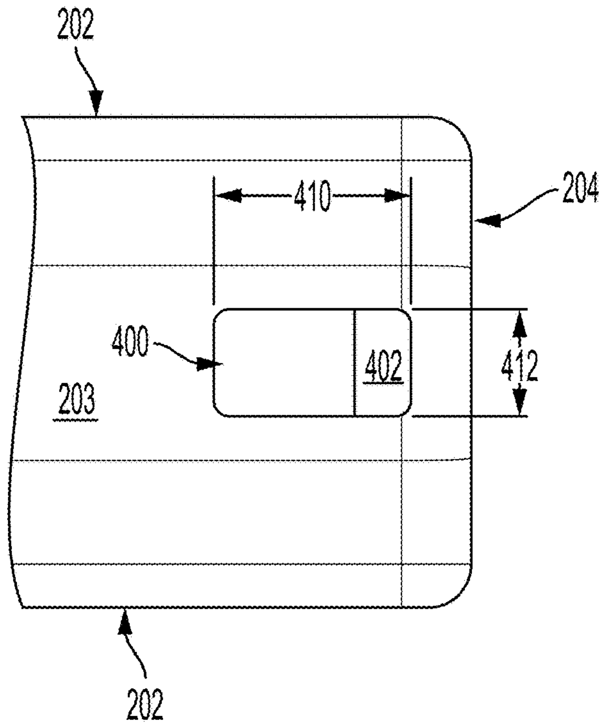
FIG. 3 is a top-down view of a portion of the container of FIG. 1 with the seal in the closed position.

As illustrated in FIGS. 3 and 4, for example, seal 400 can have a length 410 and a width 412. As illustrated in FIG. 4A, for example, seal 400 can have a thickness 414. In some embodiments, seal 400 has a length 410 of about 5 mm to about 100 mm (e.g., about 30 mm to about 80 mm or about 50 mm to about 70 mm). In some embodiments, seal 400 has a width 412 of about 5 mm to about 100 mm (e.g., about 10 mm to about 75 mm (e.g., about 15 mm to about 60 mm or about 30 mm to about 50 mm). In some embodiments, length 410 is equal to width 412. In some embodiments, seal 400 has a thickness 414 of about 0.05 mm to about 2 mm (e.g., about 0.1 mm to about 1 mm).

In some embodiments, seal 400 covers vent openings 500 such that a seal is formed by seal 400. The seal can be formed by induction sealing, heat sealing, or an adhesive. In some embodiments, seal 400 can include adhesive 408 disposed on substrate 406. In some embodiments, adhesive 408 is disposed on the side of the substrate that faces body 200 (e.g., lower surface 404 of seal 400). In some embodiments, seal 400 can be applied by contacting adhesive 408 to body 200. Adhesive 408 and substrate 406 are selected to be compatible with and withstand the formulation(s) of the product contained in the bottle. Various adhesives can be used. In some embodiments, adhesive 408 is a pressure sensitive adhesive. In some embodiments, adhesive 408 is a UV-curable adhesive. In some embodiments, adhesive is heat activated via an electro-magnetic induction process.

In some embodiments, body 200 has one or more vent openings 500. For example, in some embodiments, as illustrated in FIGS. 5A-5D, body 200 can have 1 or more vent opening (e.g., 2, 3, 4, or more vent openings). In some embodiments, seal 400 covers all vent openings 500.

Vent openings 500 can be positioned at various places on body 200. In some embodiments, vent openings 500 can be positioned proximate to a top of body 200, and the outlet of body 200 can be positioned proximate to a bottom of body 200. In some embodiments, vent openings 500 can be positioned on top wall 203. Vent openings 500 can be positioned on two different walls of body 200. In some embodiments, body 200 includes a first vent opening 500 positioned on a first wall (e.g., top wall 203) and a second vent opening 500 positioned on a second wall (e.g., side walls 202, back wall 204, or front wall 205 that is different than the first wall. In some embodiments, each vent opening 500 has a separate seal 400. In some embodiments, vent openings 500 can be positioned on a side wall 202, for example, near top edge 210 to minimize headspace in body 200. The vent openings 500 can be on top wall 203 or positioned high enough on side walls 202, back wall 204, or front wall 205 to nearly eliminate headspace in the bottle, thereby reducing unneeded plastic and wasted space. For example, when at capacity, the volume of the headspace can be less than about 10% (e.g., less than about 7%, less than about 5%, or less than about 3%, or less than 1%) of the total volume of the container. In some embodiments, the volume of the headspace is less than about 7% of the total volume of the container.

Figure 5A:
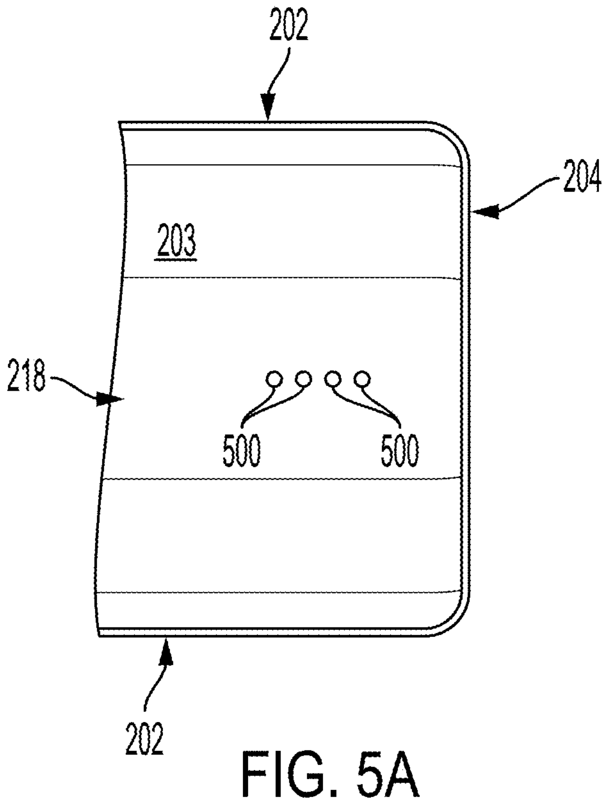
FIGS. 5A-5D show a portion of a container with vent openings according to some embodiments.
Figure 5B:
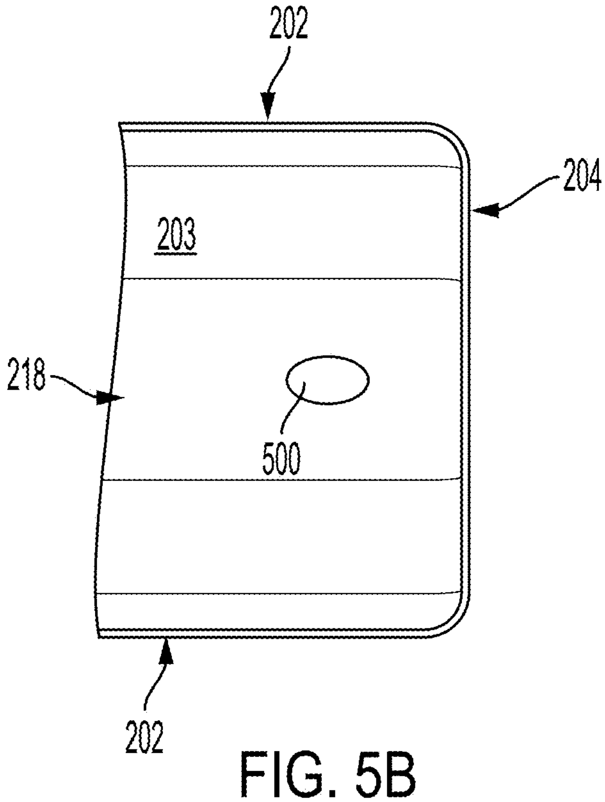
Figure 5C:
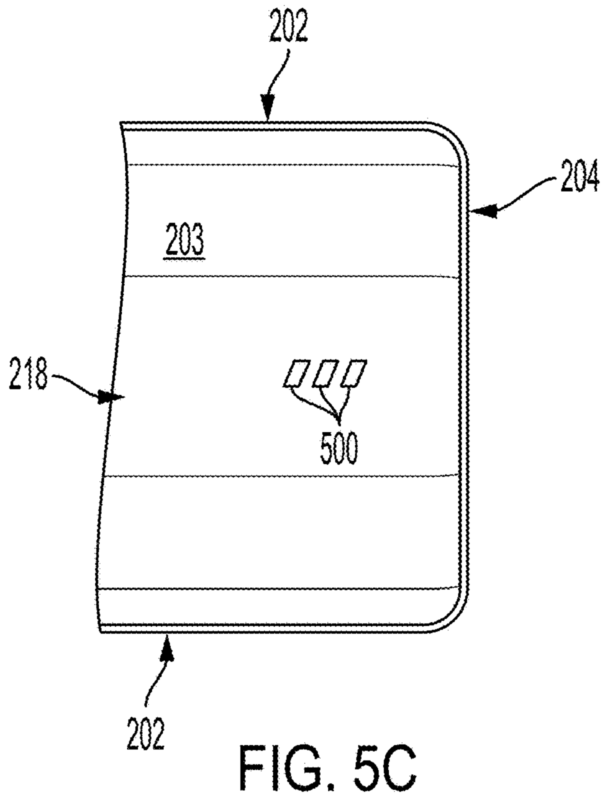
Figure 5D:
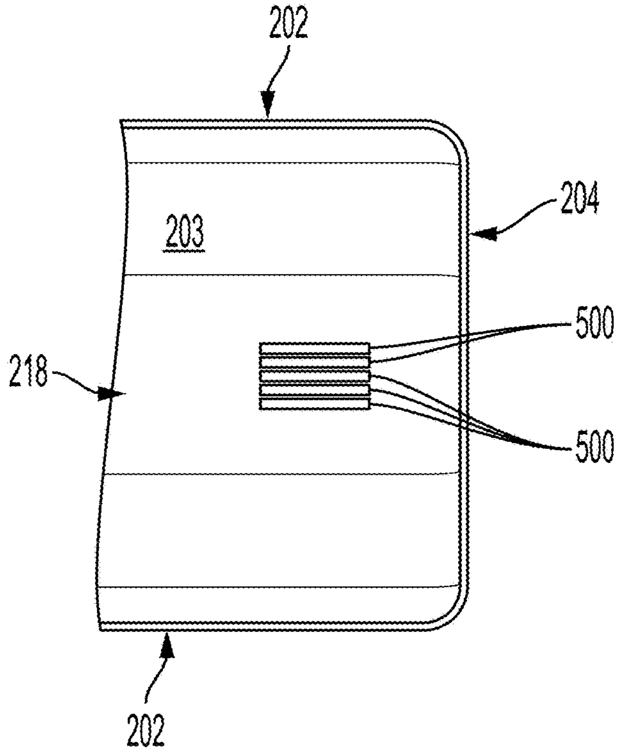

Vent openings 500 can have various shapes. In some embodiments, a first vent opening can have a different shape than a second vent opening. For example, in some embodiments, each vent opening 500 is a circle, oval, square, parallelogram, rectangle, or combination thereof. FIG. 5A illustrates circular vent openings 500. FIG. 5B illustrates oval vent openings 500. FIG. 5C illustrates parallelogram vent openings 500. FIG. 5D illustrates rectangular vent openings 500. In some embodiments, vent openings 500 can be created during a secondary manufacturing operation (e.g., after blow molding). In some embodiments, vent openings 500 are made by melting, drilling, cutting, or piercing holes in body 200.

Vent openings 500 can have various sizes. In some embodiments, a first vent opening can be larger than a second vent opening. Each vent opening 500 can have an area large enough to permit air to flow into body 200, but small enough to inhibit refilling of body 200 through vent openings 500. In some embodiments, each vent opening 500 can have an area of about 3 $mm^2$ to about 100 $mm^2$ (e.g., about 4 $mm^2$ to about 75 $mm^2$ or about 5 $mm^2$ to about 25 $mm^2$). In some embodiments, seal 400 has an area larger than vent openings 500. For example, seal 400 can have an area larger than the sum of the areas of all vent openings 500. In some embodiments, seal 400 has an area of about 4.5 $mm^2$ to about 1000 $mm^2$ (e.g., about 10 $mm^2$ to about 750 $mm^2$, about 20 $mm^2$ to about 500 $mm^2$, about 30 $mm^2$ to about 250 $mm^2$, or about 40 $mm^2$ to about 70 $mm^2$). In some embodiments, the area of seal 400 is at least 25% larger (e.g., at least 50% larger) than the total area of all vent openings 500. In some embodiments, the area of seal 400 is 50% to 100% (e.g., 60% to 80%) larger than the total area of all vent openings.

In some embodiments, container 100 can be compatible with a docking station having a dispenser. In some embodiments, when container 100 is compatible with a docking station, closure 300 can be a seal that seals an outlet of body 200 and that is broken, opened, or removed when container 100 is used with the docking station. The docking station can include, for example, a dispensing mechanism (e.g., a tap-style dispenser) configured to dispense liquid stored in interior volume 218 when container 100 is used with the docking station.

In some embodiments, container 100 can be a standalone container for dispensing liquid stored in interior volume 218. In some embodiments, closure 300 includes a dispenser through which liquid in interior volume 218 can be dispensed. For example, as illustrated in FIGS. 1 and 2, closure 300 can include side wall 302, flange 304, spout 306, and/or dispenser actuator 308. In some embodiments, closure 300 includes a valve (e.g., disposed within closure 300). In some embodiments, the valve can include a plunger that is configured to move from a closed position to an open position in response to a force applied to dispenser actuator 308. For example, in response to a downward force applied to dispenser actuator 308, the plunger can move downward from a closed position to an open position to expose a flow path through which liquid can be dispensed from interior volume 218 through spout 306.

Figure 6:
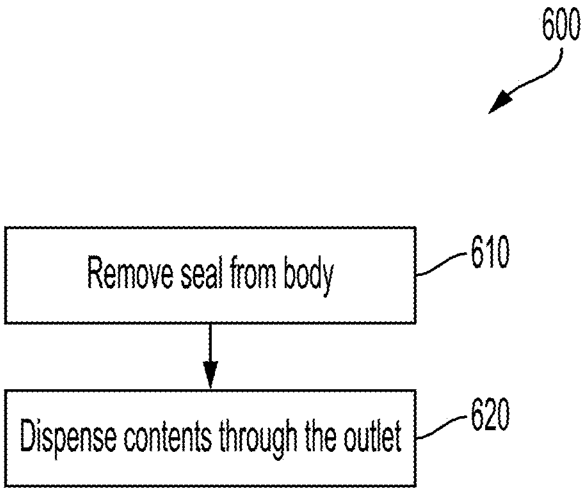
FIG. 6 shows a method for using containers according to some embodiments.

FIG. 6 illustrates a method 600 for using containers (e.g., container 100) according to some embodiments. In some embodiments, at step 610, seal 400 is removed, or at least partially removed, from body 200 to expose vent opening(s) 500. In some embodiments, at step 620, the contents of container 100 can be dispensed through an outlet.

Figure 7:
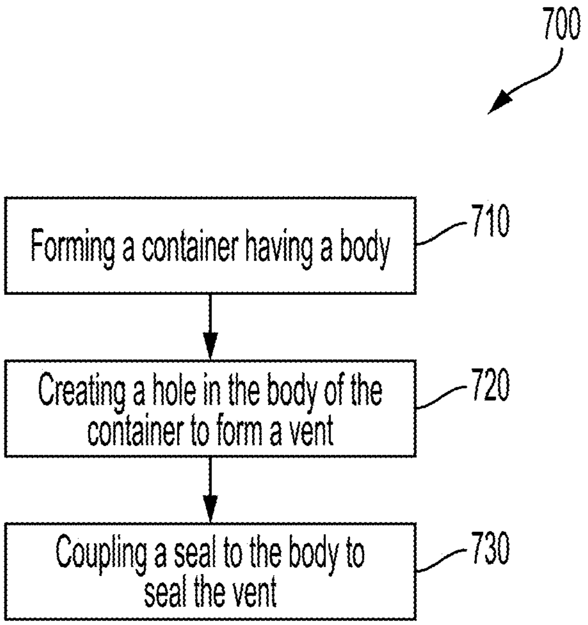
FIG. 7 shows a method for forming containers according to some embodiments.

FIG. 7 illustrates a method 700 for making containers (e.g., container 100) according to some embodiments. In some embodiments, at step 710, a container (e.g., container 100) can be formed. In some embodiments, the container has a body (e.g., body 200). In some embodiments, container 100 is made by extrusion blow molding In some embodiments, at step 720, one or more holes can be created in body 200 of container 100 to form vent openings 500. In some embodiments, the one or more holes can be created by melting, drilling, cutting, or piercing body 200. In some embodiments, at step 730, seal 400 can be coupled to body 200 to seal vent openings 500. In some embodiments, seal 400 can be coupled by positioning lower surface 404 of seal 400 proximate to vent openings 500 and applying pressure to upper surface 402 of seal 400. In some embodiments, seal 400 can include an adhesive.

As used herein, the terms "upper" and "lower," "top" and "bottom," "front" and "back," "inner" and "outer," and the like are intended to assist in understanding of embodiments of the disclosure with reference to the accompanying drawings with respect to the orientation of the closure as shown, and are not intended to be limiting to the scope of the disclosure or to limit the disclosure scope to the embodiments depicted in the Figures. The directional terms are used for convenience of description and it is understood that embodiments disclosed herein can be positioned in any of various orientations.

It is to be understood that the singular forms "a," "an," and "the" include plural referents unless the context clearly dictates otherwise. Thus, for example, reference to "a device" includes reference to one or more of such devices, i.e., that there is at least one device. Likewise plural referents are to be understood to also include the singular form.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

It is to be appreciated that the Detailed Description section, and not any other section, is intended to be used to interpret the claims. Other sections may set forth one or more but not all embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above examples are illustrative, but not limiting, of the present disclosure. Other suitable modifications and adaptations of the variety of conditions and parameters normally encountered in the field, and which would be apparent to those skilled in the art, are within the spirit and scope of the disclosure.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described embodiments, but should be defined only in accordance with the claims and their equivalents.

What is claimed is:

1. A container for dispensing a liquid, the container comprising:
- a body comprising:
  - a plurality of walls defining an interior storage volume having a volume of 0.2 L to 4 L, the plurality of walls comprising a first wall defining a front of the container and a second wall perpendicular to the first wall and defining a top of the container,
  - an outlet through the first wall of the body for dispensing the liquid, the outlet disposed proximate to a bottom of the body, and
  - a plurality of vent openings disposed in the second wall;
- a dispenser coupled to the outlet, the dispenser comprising:
  - a spout for dispensing the liquid,
  - a valve configured to move between a closed position and an open position, wherein the valve seals the spout in the closed position, and
  - an actuator configured to move the valve from the closed position to the open position; and
- a seal for covering all vent openings of the plurality of vent openings, the seal comprising:
  - an upper surface and a lower surface configured to contact the body, the lower surface comprising a first portion and a second portion;
  - an adhesive disposed on the lower surface of the seal to removably couple the seal to the body of the container; and
  - a seam between the first portion and the second portion, wherein the seal has a length of 5 mm to 50 mm and a width of 5 mm to 20 mm.

2. The container of claim 1, wherein the seal has a thickness of 0.05 mm to 0.75 mm.

3. The container of claim 1, wherein the seal is configured to detach from the body.

4. The container of claim 1, wherein the plurality of vent opening is disposed in the second wall proximate to a third wall that is perpendicular to the second wall and defines a back of the container.

5. The container of claim 1, wherein the container is a gravity-fed container.

6. The container of claim 1, wherein an area of an upper surface of the seal is larger than an area of the plurality of vent openings such that the seal covers the plurality of vent openings and adheres to the second wall of the body.

7. The container of claim 1, wherein an area of a first vent opening of the plurality of vent openings is 3 $mm^2$ to 100 $mm^2$.

8. The container of claim 1, wherein the adhesive is a pressure sensitive adhesive.

9. The container of claim 1, wherein the valve is configured to move from the closed position to the open position in response to a downward force applied to the actuator.

10. The container of claim 1, wherein the spout is oriented parallel to the first wall.

11. The container of claim 1, further comprising:
- the liquid disposed in the interior storage volume, and
- a headspace at atmospheric pressure disposed in the interior storage volume above the liquid.

12. The container of claim 1, wherein the plurality of vent openings comprises a first vent opening and a second vent opening, and wherein the first vent opening is a different shape than the second vent opening.

13. A method of making a container with a vent, the method comprising:
- forming the container by extrusion blow-molding, the container comprising:
  - a plurality of walls defining an interior storage volume, the plurality of walls comprising a first wall defining a front of the container and a second wall perpendicular to the first wall and defining a top of the container, and
  - an outlet through the first wall for dispensing a liquid, the outlet disposed proximate to a bottom of the first wall;
- creating a plurality of holes in the second wall to form the vent;
- coupling a seal to the second wall to cover the vent, the seal comprising:
  - a first portion, a second portion, and a seam between the first portion and the second portion; and
  - an adhesive on an entire lower surface of the seal; and coupling a dispenser to the outlet, the dispenser comprising:
- a spout for dispensing the liquid,
- a valve configured to move between a closed position and an open position, wherein the valve seals the spout in the closed position, and
- an actuator configured to move the valve from the closed position to the open position in response to a downward force applied to the actuator.

14. The method of claim 1, wherein the adhesive is disposed only on the second portion such that the first portion is not adhered to the body of the container.

15. The method of claim 14, wherein the first portion is smaller than the second portion, and wherein the first portion forms a tab configured to be pulled to separate the seal from the body.

16. The method of claim 13, wherein the seal further comprises a cellulose-based substrate.

17. The method of claim 13, wherein creating the plurality of holes comprises melting, drilling, cutting, or piercing the second wall to form the vent.

18. The method of claim 13, wherein coupling the seal to the second wall comprises positioning the lower surface of the seal proximate to the vent, and applying pressure to an upper surface of the seal toward the second wall.

19. The method of claim 13, further comprising filling the container with a liquid.

20. The method of claim 13, wherein the seam comprises a perforation line extending between a first edge of the seal to a second edge of the seal, and wherein the first portion is configured to be separated from the second portion at the perforation line.

* * * * *